(12) United States Patent
Shalini et al.

(10) Patent No.: US 12,197,978 B2
(45) Date of Patent: Jan. 14, 2025

(54) UNIQUE DEVICE IDENTIFICATION FOR DEVICES

(71) Applicant: ACCENTURE GLOBAL SOLUTIONS LIMITED, Dublin (IE)

(72) Inventors: Soumya Shalini, Banalore (IN); Ninad Datta Patil, Mumbai (IN); Rupak Udayanan, Bangalore (IN); Ashok Nadimpalli, Mandal (IN); Agalya Arjunan, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 488 days.

(21) Appl. No.: 17/530,191

(22) Filed: Nov. 18, 2021

(65) Prior Publication Data
US 2023/0153471 A1    May 18, 2023

(51) Int. Cl.
*G06Q 10/087*    (2023.01)
*G01K 11/12*    (2021.01)
*G06K 17/00*    (2006.01)
*G06Q 10/08*    (2024.01)

(52) U.S. Cl.
CPC ....... *G06K 17/0022* (2013.01); *G06Q 10/087* (2013.01)

(58) Field of Classification Search
CPC .......................... G06K 17/0022; G06Q 10/087
See application file for complete search history.

(56) References Cited

U.S. PATENT DOCUMENTS

| | | | |
|---|---|---|---|
| 8,533,075 B1* | 9/2013 | Sayers, III | G16H 40/20 705/28 |
| 8,756,124 B1* | 6/2014 | Sayers, III | G06Q 30/0185 705/28 |
| 2005/0230479 A1* | 10/2005 | Chapman | G06K 1/18 235/462.13 |
| 2008/0052205 A1* | 2/2008 | Dolley | G06Q 10/06 705/28 |
| 2021/0067342 A1* | 3/2021 | Guinard | H04L 9/0866 |
| 2023/0135805 A1* | 5/2023 | Axelsson | G06Q 10/0833 705/332 |

\* cited by examiner

*Primary Examiner* — Talia F Crawley
(74) *Attorney, Agent, or Firm* — Mannava & Kang, P.C.

(57) ABSTRACT

Systems and methods for unique device identification for devices are disclosed. An example system comprises a processor causing a Unique Device Identification Platform (UDIP) to generate, in real-time, for a first device, a unique device identifier (UDI), based on at least one of an article number associated with a category of devices that first device forms part of, serial number of first device, manufacturing batch number of first device, and a shelf-life expiry date. The processor may cause the UDIP to track, based on the generated UDI, a first device in its respective supply chain to trace a current location of first device. Further, the processor may cause the UDIP to render, in response to a request message from a user at a first-time instance, based on a trace of first device using UDI at the time instance, an output indicative of production attributes, component attributes, and supply chain attributes of the first device.

20 Claims, 16 Drawing Sheets

| Output type | Interactive ALV and Form Output |
|---|---|
| Transaction Code | /ACNIP/ZLS_UDI |

FIG. 2N

| Test objective | Unit Test Log | | |
|---|---|---|---|
| Step No. | Date | Description | Expected Output/Results |
| 1 | 30-Jun-20 | Screen Input Validation | Display error message for invalid input entries |
| 2 | 30-Jun-20 | Data not available | Display error message, if combination of screen inputs not available in S4 HANA system. |
| 3 | 30-Jun-20 | ALV display for valid available data | Display Interactive ALV for available data provided through input screen |
| 4 | 30-Jun-20 | UDI label display for selected ALV records | UDI label display / print for records with UDi number |
| Notes | | | |

FIG. 2O

| Sl. No. | Symbol | Text |
|---|---|---|
| 1 |  | Keep Dry |
| 2 |  | Expiry Date |
| 3 |  | Batch |
| 4 |  | Serial Number |
| 5 |  | Handle With Care |
| 6 |  | Fragile |
| 7 |  | Do Not Use If Package Is Damaged |
| 8 |  | Single Use |
| 9 |  | Manufacturer |
| 10 |  | Max. Temperature Allowed |

UNIQUE DEVICE IDENTIFICATION FOR DEVICES

BACKGROUND

Generally, medical device regulatory organizations such as, for example, an International Medical Device Regulator Forum (IMDRF), a United States Food and Drug Administration (FDA), and a European Commission (EC) may aim for a globally harmonized and consistent approach to increase patient safety and help optimize patient care by proposing a harmonized legislation for Unique Device Identification, using global standards. For example, class I products (such as adhesive bandages, wheelchairs, tongue depressors) at low risk of patient safety and product compliance, include UDI compliance timelines which may include the Food and Drug Administration (FDA) compliance timeline to be on Sep. 24, 2020, and the European Commission (EC) compliance timeline to be on May 26, 2025. Similarly, for example, class II products (such as catheters, needles, contact lenses) at moderate risk of patient safety and product compliance, include UDI compliance timelines, which include the FDA compliance timeline to be on Sep. 24, 2018, and the EC compliance timeline to be on May 26, 2023. Furthermore, class III products (such as pacemakers, coronary stents, orthopedic implants) at high risk of patient safety and product compliance, include UDI compliance timelines, which include the FDA compliance timeline to be on Sep. 24, 2016, and the EC compliance timeline to be on May 26, 2021.

One of the main concerns for device manufacturers and users may be counterfeiting and device tracking, leading to risks such as patient safety and product compliance.

SUMMARY

An embodiment of present disclosure includes a system comprising a Unique Device Identification platform operatively coupled with a processor. The processor may cause the Unique Device Identification platform to generate, in real-time, for a first device, a unique device identifier (UDI), based on at least one of an article number associated with category of devices that the first device forms part of, a serial number of the first device, a manufacturing batch number of the first device, and a shelf-life expiry date of the first device. The processor may cause the Unique Device Identification platform to track, based on the generated UDI, the first device in its respective supply chain to trace a current location of the first device. Further, the processor may cause the Unique Device Identification platform to render, in response to a request message from a user at a first-time instance, based on the trace of the first device using the UDI at the time instance, an output indicative of production attributes, component attributes, and supply chain attributes of the first device.

In an example embodiment, the production attributes of the first device may include at least one of parameters associated with material used in manufacturing of the first device, plant where the first device or parts thereof were manufactured, lot number, production order, global trade item number (GTIN), the serial number of the first device, the manufacturing batch number of the first device, the shelf-life expiry date of the first device, production order date, and invoice details.

In another example embodiment, the component attributes of the first device may be selected from at least one of attributes, identifiers, and parameters of one or more components or sub-components that form part of the first device. In an aspect, the supply chain attributes may include information associated with transfer/flow of the first device and respective components thereof across the supply chain from sourcing to production to delivery and distribution of the first device to flow of the first device during recall/return of the first device or any component thereof. In yet another aspect, the UDI may either generated in real-time or may be serially generated. The UDI may be printed on a label and affixed to the first device post production. The UDI may be configured in the form of at least one of a barcode, a OR code, and in Braille format.

Another embodiment of the present disclosure may include a method for unique device identification for devices. The method may include generating, in real-time, for a first device, a unique device identifier (UDI), based on at least one of an article number associated with category of devices that the first device forms part of, serial number of the first device, manufacturing batch number of the first device, and shelf-life expiry date of the first device. The method may include tracking, based on the generated UDI, the first device in its respective supply chain to trace a current location of the first device. Further, the method may include rendering, in response to a request message from a user at a first-time instance, based on the trace of the first device using the UDI at the time instance, an output indicative of production attributes, component attributes, and supply chain attributes of the first device.

Yet another embodiment of the present disclosure may include a non-transitory computer readable medium comprising machine executable instructions that may be executable by a processor to receive an input data corresponding to a programming language. The processor may generate, in real-time, for a first device, a unique device identifier (UDI), based on at least one of an article number associated with category of devices that the first device forms part of, serial number of the first device, manufacturing batch number of the first device, and shelf-life expiry date of the first device. The processor may track, based on the generated UDI, the first device in its respective supply chain to trace a current location of the first device. Further, the processor may render, in response to a request message from a user at a first-time instance, based on the trace of the first device using the UDI at the time instance, an output indicative of production attributes, component attributes, and supply chain attributes of the first device.

BRIEF DESCRIPTION OF DRAWINGS

FIGS. 2H and 2I illustrate schematic representations of defining parameters types to remotely transfer data between S4 HANA module and ATTP module, according to an example embodiment of the present disclosure, FIG. 2J illustrates a schematic representation of sending data to Application server for GUDID (third party), according to an example embodiment of the present disclosure.

FIGS. 2K and 2L illustrate schematic representations of creating a logical file name using T code file, according to an example embodiment of the present disclosure.

FIG. 2M illustrates a schematic representation of XML transformation to convert internal table data into XML format, according to an example embodiment of the present disclosure.

FIGS. 2N and 2O illustrate tables for report details, and testing requirements with key unit/assembly test conditions, according to an example embodiment of the present disclosure.

DETAILED DESCRIPTION

Figure 1:
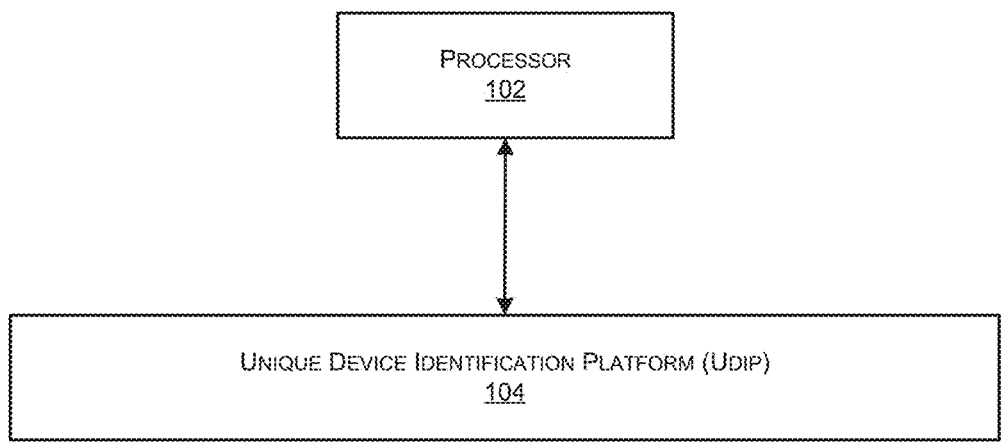
FIG. 1 illustrates a block diagram representation of a system for unique device identification for devices, according to an example embodiment of the present disclosure.

For simplicity and illustrative purposes, the present disclosure may be described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the term "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what may be being performed or considered.

Overview

Various embodiments describe providing a solution in the form of a system and a method for unique device identification for devices. The system may generate, in real-time, for a first device, a unique device identifier (UDI), based on at least one of an article number associated with category of devices that the first device forms part of, serial number of the first device, manufacturing batch number of the first device, and shelf-life expiry date of the first device. The system may track, based on the generated UDI, the first device in its respective supply chain to trace a current location of the first device. Further, the system may render, in response to a request message from a user at a first-time instance, based on the trace of the first device using the UDI at the time instance, an output indicative of production attributes, component attributes, and supply chain attributes of the first device.

In example embodiment, the production attributes of the first device may include at least one of parameters associated with material used in manufacturing of the first device, plant where the first device or parts thereof were manufactured, lot number, production order, global trade item number (GTIN), the serial number of the first device, the manufacturing batch number of the first device, the shelf-life expiry date of the first device, production order date, and invoice details.

In example embodiment, the component attributes of the first device may be selected from at least one of attributes, identifiers, and parameters of one or more components or sub-components that form part of the first device. In an aspect, the supply chain attributes may include information associated with transfer/flow of the first device and respective components thereof across the supply chain from sourcing to production to delivery and distribution of the first device to flow of the first device during recall/return of the first device or any component thereof. In yet another aspect, the UDI may either generated in real-time or may be serially generated. The UDI may be printed on a label and affixed to the first device post production. The UDI may be configured in the form of at least one of, a barcode, a QR code, and in Braille format.

Exemplary embodiments of the present disclosure have been described in the framework of improved unique device identification for devices to eliminate counterfeiting, provide device tracking, eliminate risks such as patient safety and product compliance. Embodiments of the present disclosure provide a SAP® business suite 4 Advanced Track & Trace for Pharmaceuticals (S/4-ATTP) variant (V1) for random serial numbers generation in SAP® ATTP system, and a standalone S/4 variant (V2) for sequenced serial numbers generated in a SAP® business suite 4 High-Speed Analytical Appliance (S/4 HANA) system. Embodiments of the present disclosure interface the S/4 HANA system with the SAP ATTP system to generate random numbers for serialization. To mark and identify devices within the healthcare supply chain a Unique Device Identifier (UDI) may be used as a regulatory standard. Randomness of the UDI may provide more secure regulatory standard for UDI than direct number generation via the S/4 HANA system. Embodiments herein include delivery of a UDI report and a UDI form (human readable form). Embodiments of the present disclosure increase prefect production order measurement and decrease in customer order cycle time. Embodiments of the present disclosure increases patient's safety, regulatory compliance, enhance effective product recalls/returns. Embodiments of the present disclosure assure a Food and Drug Administration (FDA) compliant UDI Report. The UDI report can be generated for every device (finished goods) that may be manufactured and has passed quality checks. The UDI report may include all the relevant data for device including a UDI number and fetch II relevant data such as a European Article Number (EAN), a serial number, a batch, and a shelf-life expiry date. If the product is returned by the consumer or retailer/wholesaler, the manufacturer may check the authenticity of the device based on checking the respective UDI of the device. Embodiments of the present disclosure allow viewing a print preview of UDI label (UDI form). Furthermore, the generated UDI label may have braille interpretation included to make it more inclusive. The UDI number may be achieved by concatenation of Device Identifier (DI) and Production Identifier (PI). Further, the UDI may be utilized in device traceability and as a regulatory requirement.

FIG. 1 illustrates a block diagram representation of a system 100 for unique device identification for devices, according to an example embodiment of the present disclosure. The devices may include, but not limited to, medical devices, machinery devices, mechanical devices, electronic devices, and the like. The system 100 may be implemented by way of a single device or a combination of multiple devices that may be operatively connected or networked together. The system 100 may be implemented in hardware or a suitable combination of hardware and software. The system 100 includes a processor 102. The system 100 may include a unique device identification platform (UDIP) 104.

The system 100 may be a hardware device including the processor 102 executing machine-readable program instructions to perform lead conversion using conversational virtual agent, Execution of the machine-readable program instructions by the processor 102 may enable the proposed system 100 to unique device identification. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 102 may include, for example, microprocessors, microcomputers, microcontrollers, digital signal processors, central processing units, state machines, logic circuits, and/or any devices that manipulate data or signals based on operational instructions. Among other capabilities, processor 102 may fetch and execute computer-readable instructions in a memory operationally coupled with system 100 for performing tasks such as data processing, input/output processing, feature extraction, and/or any other functions. Any reference to a task in the present disclosure may refer to an operation being or that may be performed on data.

In an embodiment, the processor 102 may cause the Unique Device Identification Platform (UDIP) 104 to generate, in real-time, for a first device, a unique device identifier (UDI), based on at least one of an article number associated with category of devices that the first device forms part of, a serial number of the first device, a manufacturing batch number of the first device, and a shelf-life expiry date of the first device. In an embodiment, the UDI may either be generated in real-time or may be serially generated. In an embodiment, the UDI may be printed on a label and affixed to the first device post production. The UDI may be configured in the form of, but not limited to, a barcode, a QR code, in Braille format and, the like.

In an embodiment, the processor 102 may cause the Unique Device Identification Platform (UDIP) 104 to track, based on the generated UDI, the first device in its respective supply chain to trace a current location of the first device. Further, the processor 102 may cause the Unique Device Identification platform 104 to render, in response to a request message from a user at a first-time instance, based on the trace of the first device using the UDI at the time instance, an output indicative of production attributes, component attributes, and supply chain attributes of the first device.

In an embodiment, the production attributes of the first device may include, but are not limited to, parameters associated with material used in manufacturing of the first device, plant where the first device or parts thereof were manufactured, a lot number, a production order, a global trade item number (GTIN), the serial number of the first device, the manufacturing batch number of the first device, the shelf-life expiry date of the first device, production order date, invoice details, and the like. The invoice details may include, but are not limited to, a price, a sub-total price, a total price, tax information, addresses, customer information, company details, warranty details, a discount, and the like. In an embodiment, the component attributes of the first device may be selected from, but not limited to, attributes, identifiers, parameters of one or more components or sub-components that form part of the first device, and the like. In an embodiment, the supply chain attributes may include, but not limited to, information associated with transfer/flow of the first device and respective components thereof across the supply chain from sourcing to production to delivery and distribution of the first device to flow of the first device during recall/return of the first device or any component thereof, and the like.

Figure 2A:
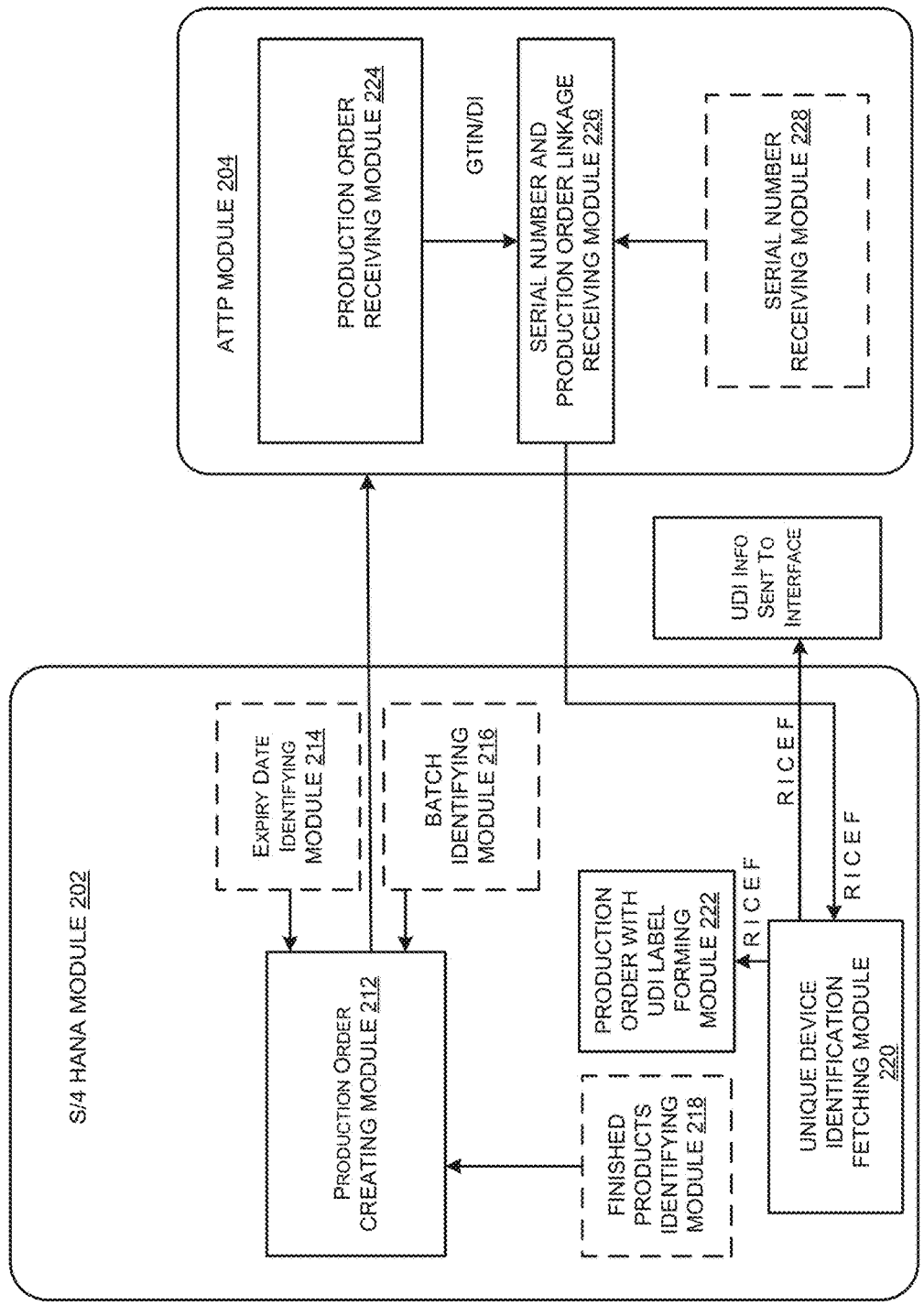
FIGS. 2A and 2B illustrate block diagram representations of components for two example variants of the system of FIG. 1, according to an example embodiment of the present disclosure.
Figure 2B:
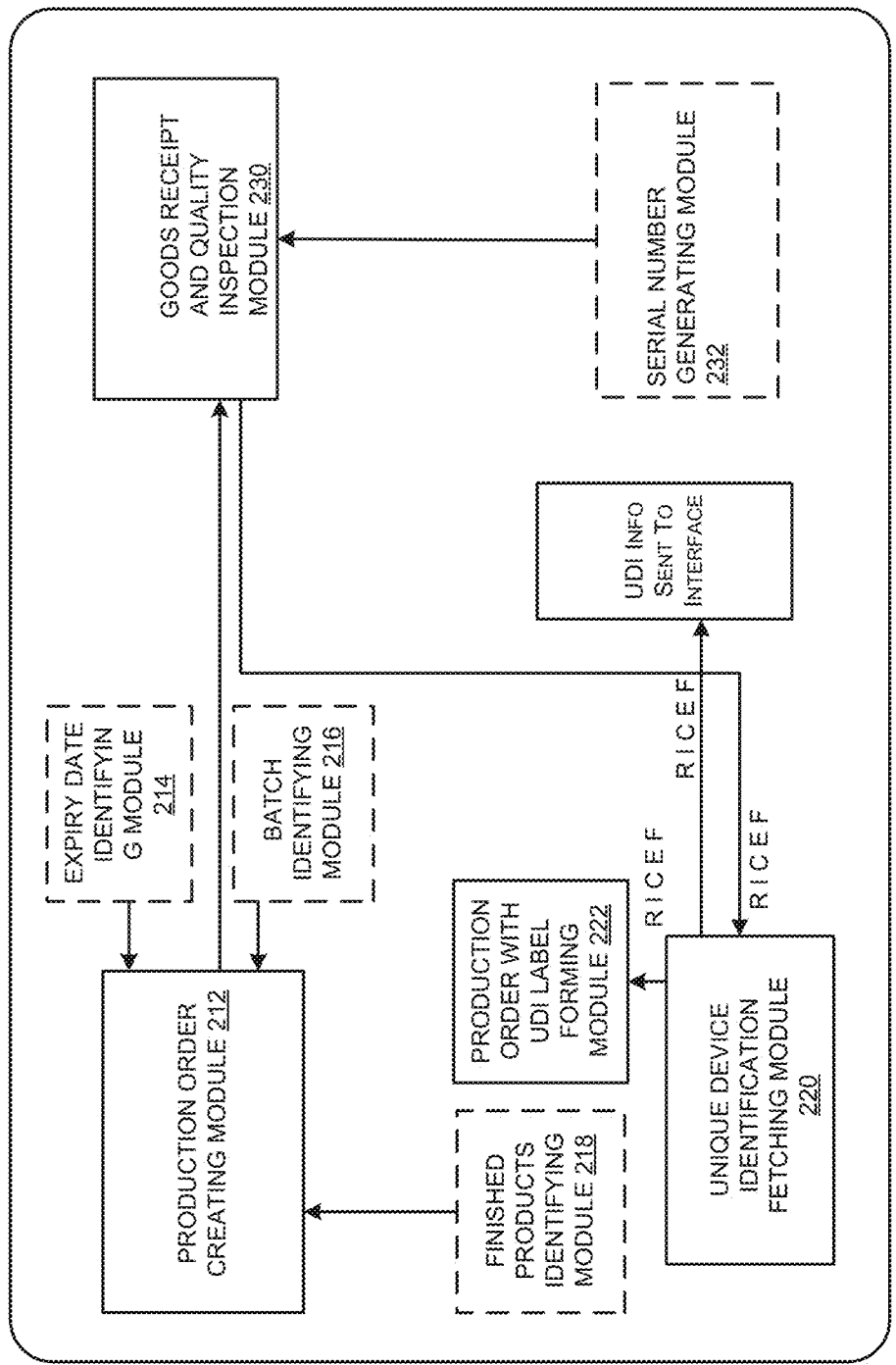

FIGS. 2A and 2B illustrate block diagram representations of components for two example variants of the system 100 of FIG. 1, according to an example embodiment of the present disclosure. Referring FIG. 2A, the system 100 may be SAP® business suite 4 High-Speed Analytical Appliance (S/4 HANA) and Advanced Track & Trace for Pharmaceuticals (ATTP) variant system, i.e., S/4-ATTP variant. The S/4-ATTP variant generate a random serial number. The system 100 of S/4-ATTP ATTP variant, may include a S/4 HANA module 202 and an ATTP module 204. Further, the S/4 HANA module 202 may include sub-modules such as a production order creating module 212, an expiry date identifying module 214, a batch identifying module 216, a finished products identifying module 218, a unique device identification fetching module 220, and a production order with UDI label forming module 222. Further, the ATTP module 202 may include sub-modules such as a production order receiving module 224, a serial number and production order linkage receiving module 226, and a serial number receiving module 228.

Consider, for example, an organization structure may need to be set up in place mirroring the actual structure of the company. The company codes and plants may need to be configured along with the storage locations, warehouses, and other such information. Further, customer data and material master data may need to be created. The material master data may need to be extended to the sales views from which the material may be sold/delivered. Furthermore, pricing master data may need to be in place to sell materials. Records may need to be created for automatic determination of batches based on the first-expire first-out strategy condition.

Figure 2C:
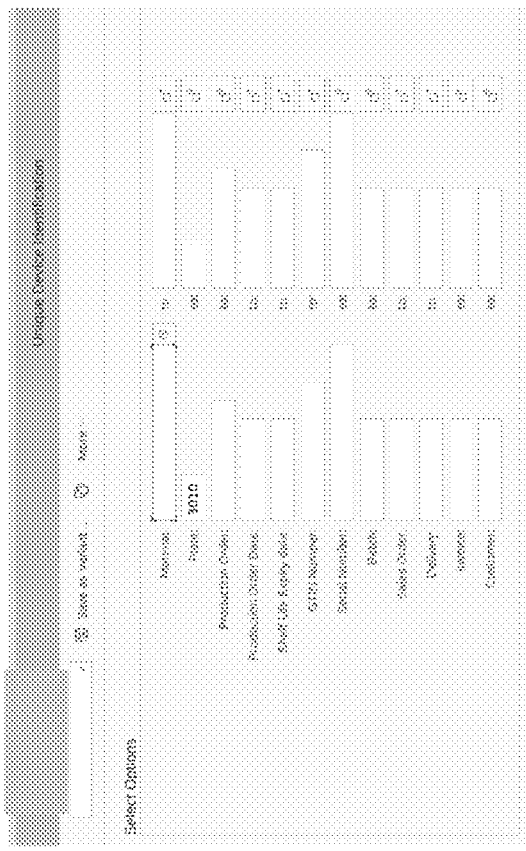
FIG. 2C illustrates a schematic representation of entries of Table of Variant Variables Client-specific data (TVARVC), according to an example embodiment of the present disclosure.

For instance, a user such as, for example, a production supervisor at discreet manufacturing plant, may create a new program (e.g., ACNIP/ZLS_ATTP_UDI) on the system 100, using SE38 (i.e., ABAP Editor in SAP®) Transaction (T) code and attach the new program to new T code such as an ACNIP/ZLS_UDI. Further, the system 100 may maintain a Table of Variant Variables Client-specific data (TVARVC) (i.e., standard SAP table which may be used to store Table of Variant Variables (client-specific) data and may be available within R/3 SAP systems depending on the version and release level) entries as shown in FIG. 2C. The entries may need to be maintained in the TVARVC before executing the UDI report. Further, the system 100 may read values for the variables of table as shown in FIG. 2C, and the system 100 may use in subsequent logic, which may in turn eliminates hard coding. In a program INITIALIZATION event, the system 100 may read the TVARVC entries, for example, plant values as GV_PLANT, a material type as GV_MTART, a Remote Function Call (RFC) destination as GV_RFC_DEST, identifiers for batch, an expiry date, a Global Trade Item Number (GTIN), a serial number as GV BATCH IDENTIFIER, an expiry date as GV_EXPDATE_IDENTIFIER, a GTIN identifier as GV_GTIN_IDENTIFIER, a serial identifier as GV_SERIAL_IDENTIFIER to be used in the program logic.

Figure 2D:
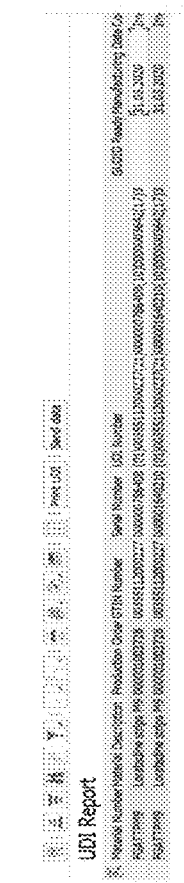
FIG. 2D illustrates a schematic representation of selection screen, according to an example embodiment of the present disclosure.
Figure 2E:
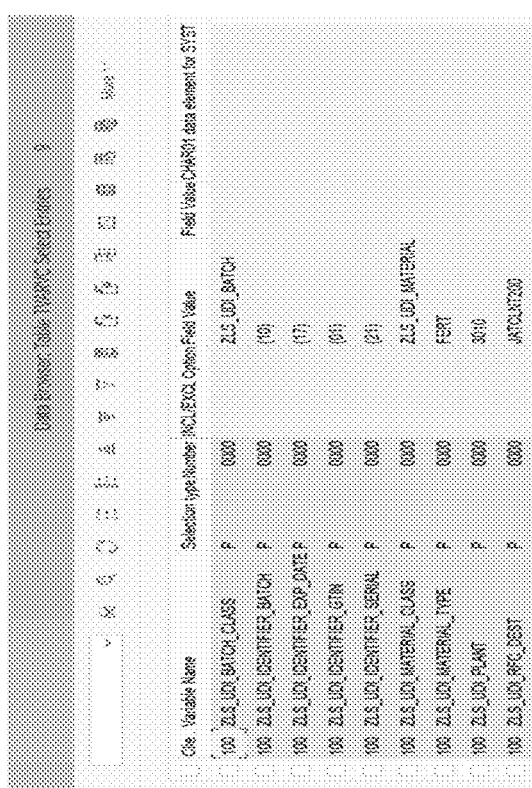
FIG. 2E illustrates a schematic representation of checking screen of invoice and material combination existence, according to an example embodiment of the present disclosure.

Further, the system 100 may create a selection screen with screen elements/fields as shown in FIG. 2D. A plant value may be defaulted to 'ZLS_UDI_PLANT' field value maintained in TVARVC table shown in FIG. 2C. Further, the system 100 may validate at screen level such as, but are not limited to, if material may not be a finished product, i.e., material entered has different material type than TVARVC value maintained for 'ZLS_UDI_MATERIAL_TYPE', invalid plant, if plant entered does not exist in the system 100, check if batch/serial number/production order/date may be provided along with material number, check if given material/batch/plant exist in system 100, validate shelf life expiry date entered for a given batch, check for production order and material combination, invalid sales order if, sales order entered does not exist in the system 100, invalid delivery if, delivery entered does not exist the system 100, invalid invoice if, invoice entered does not exist in the system 100, invalid customer if, customer entered does not exist in the system 100. check if sales order and material combination exist in the system 100, check if delivery and material combination exist in the system 100, check if invoice and material combination exist in the system 100, and the like, as shown in FIG. 2E. The finished product may be identified using the finished products identifying module 218 as shown in FIG. 2B.

Based on selection screen criteria, the system 100 via the production order creating module 212 of FIG. 2B, may create/obtain a production order data from AFKO table (standard production orders transparent table in SAP Product Planning (PP) application), AFPO table (standard production orders transparent table in SAP PP application) and AUFK table (a standard SAP Table which may be used to store Order master data data), for given production order material check Material type (MTART) as GV_MTART and EAN11 (a standard field within SAP Table mare (Material Master Transparent Table)) with non-initial value in MARA table, also get the Material text from MAKT table (storing material descriptions related data) into internal table LT_ORDER. If corresponding data may not be found, then display error message as 'no data found for the given selection criteria' and exit program processing.

If batch details are not available in the AFPO for production order, the batch identifying module 216 may identify the batch details from corresponding material document created if any, and use the batch details for further processing. Further, for the obtained production orders with batch details, the expiry date identifying module 214 may obtain an ERSDA (i.e., created-on information) (standard field within SAP table MARA that stores created-on information) and an expiry date (VFDAT). Further, the batch identifying module 216 may obtain an internal object number such as batch classification (CUOBJ_BM) from a MCH1 table (standard material master transparent table). The production order creating module 212 may update the fields such as expiry date (VFDAT), internal object number such as batch classification from the MCH1 in internal table LT_ORDER. Using MCH1-CUOBJ_BM (stores Internal object no. information), the batch identifying module 216 may obtain READY_GUDID characteristic value for batch from ASUP table.

Further, the production order receiving module 224 of the ATTP module 202 may receive the production orders with batch details. For all the orders in the internal table (LT_ORDER), the serial number receiving module 228 may receive the serial numbers and container (SSCC) number from the ATTP module 202 using an RFC function module (not shown in figures) (iACNIP/ZLS_GETSERIALNUMBERS). Further, the serial number and production order linkage receiving module 226 may provide linkage between the serial number and production order. Based on the SSCC number for the production order, the system 100 may obtain associated delivery from a VEKP table (header unit-header table and a standard basic functions transparent table).

For instance, consider that the SSCC number for production order may be used when packing devices for delivery. The system 100 may delete the deliveries from further processing which are not provided on the selection screen. For a given delivery the system 100 may obtain the ship to party (LIKP-KUNNR), sales order (LIPS-VGBEL). For a given delivery, the system 100 may obtain an invoice (VBRK-VBELN) details, if generated. Further, the unique device identification fetching module 220 may collect all the required fields in an internal table for ALV display (GT_ALVDATA). The UDI number for a production order may be a combination of GTIN number, serial number, batch, expiry date along with the identifiers such as UDI number (01), GTIN Number, (21) serial number, (10), batch (17), expiry date. If any one of the parameters in the UDI number for a production order may be missing for a given record, the system 100 may not generate the UDI number. For example, the system 100 may update/display in the 'comments' field of the screen for any missing numbers/details based on each case. For instance, the system 100 may display error message as 'serial number is not generated' or 'shelf-life expiry date not available'. The system 100 may delete invoice/sales order/deliveries which are not provided on selection screen from GT_ALVDATA table. After filtration/deletion, the system 100 may display records using ALV display (ABAP Objects programming environment), and if no data available, then the system 100 may display error message as 'no data found for the given selection criteria' and exit program processing. On the ALV display the system 110 may provide an option to print the UDI number using 'Print UDI' button.

Figure 2F:
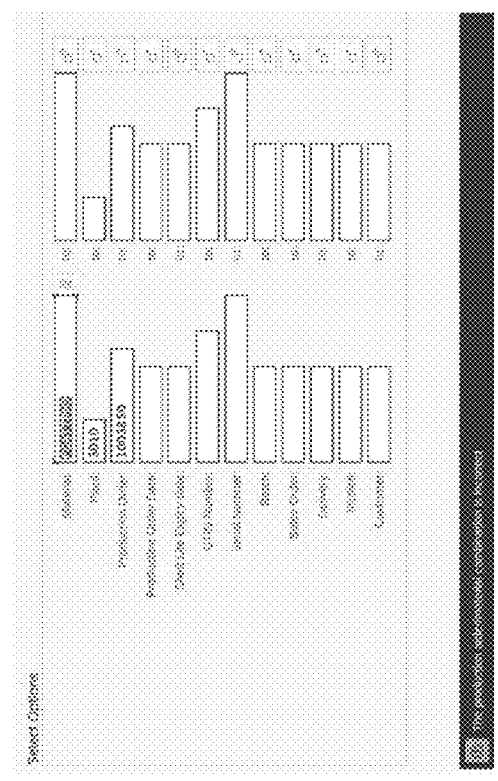
FIG. 2F illustrates a schematic representation UDI report, according to an example embodiment of the present disclosure.
Figure 2G:
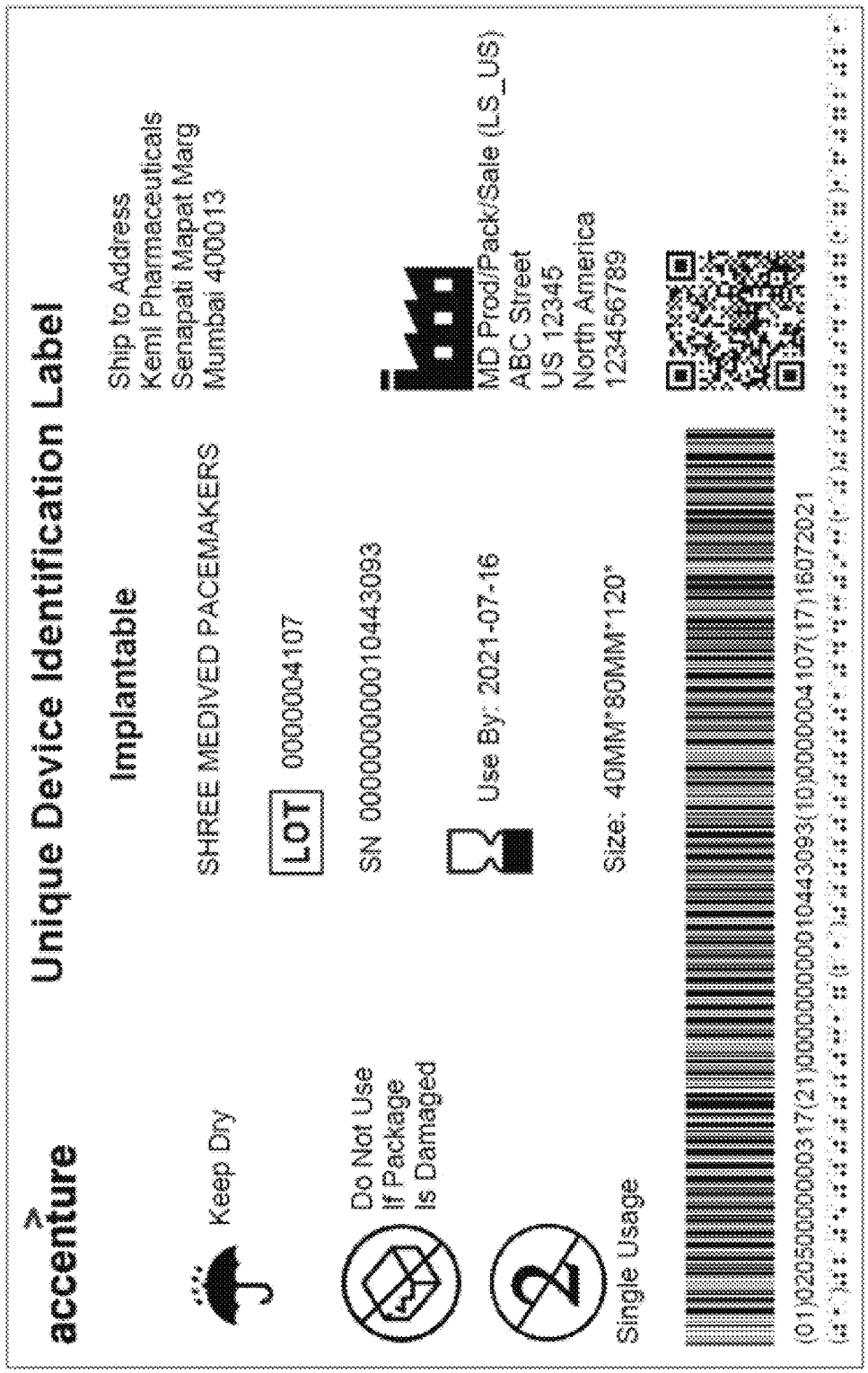
FIG. 2G illustrates a schematic representation of UDI label, according to an example embodiment of the present disclosure.
Figures 2H, 2I, 2J, 2K:
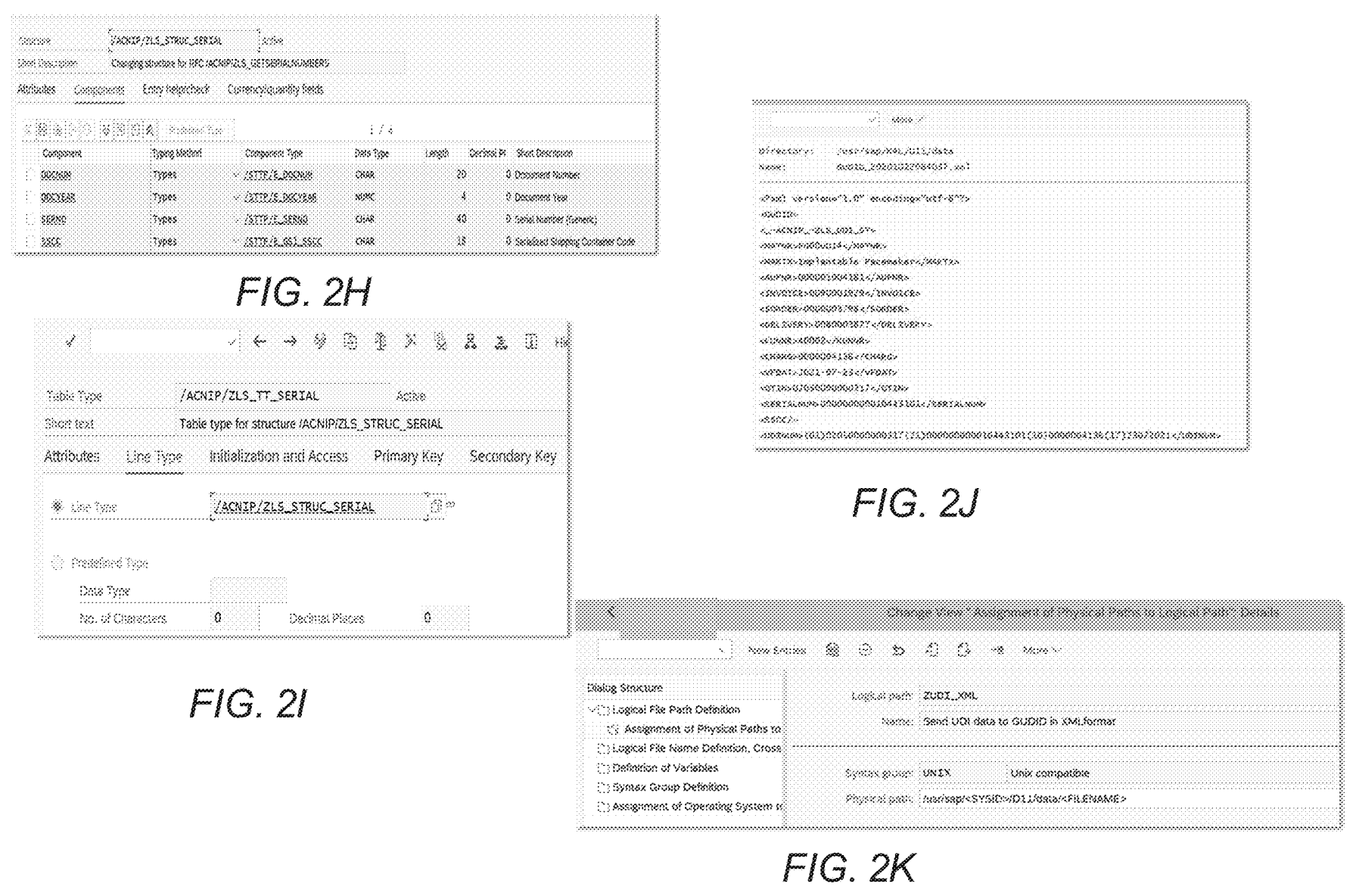

The user can select multiple records with the UDI number to display/print UDI label or send it to AL11 for GUDID as shown in FIG. 2F. The system 100 may preview UDI label as shown in FIG. 2G. The display/print UDI label option may be provided by the system 100 using PDF form '/ACNIP/ZLS_UDI_FORM'. The Remote Function CALL (RFC) function module '/ACNIP/ZLS_GETSERIALNUMBERS' may create remote enabled function module in RFC module specified in variable GV_RFC_DEST, which may be maintained in the TVARVC table. The system 100 may create a new structure and table types in SE11, for defining the parameters types to remotely transfer data between S/4 HANA module 202 and ATTP module 204 as shown in FIGS. 2H and 2I.

The function module may have parameters such as importing parameter, which may be IV_DOCTYPE—business transaction for document, and changing parameter, which may be CT_DOCUMENTS list of documents. The system 100 may call the RFC module from S/4 HANA module 202 by passing a temporary table of production orders, a date, a serial number and a SSCC number as CT_DOCUMENTS. The system 110 may pass values only for production order and date. The function module may update the values for the ATTP serial number and the SSCC number as per below logic:

For a given document type and document/year combination, get transactionID (/STTP/DM_TRN-TRNID).
For given transaction ID, get object identifier (/STTP/DM_TRN_REL-OBJID) Logic for Serial Number:
Using the object identifier get, serial number (/STTP/DM_OBJ_ITM-SERNO). Logic for SSCC Number:
Using the object identifier get, SSCC number (/STTP/DM_OBJ_IDS-SERIAL).
Update serial number and SSCC number from the above steps to changing table, which may be then provided to calling S/4 HANA module 202.

Further, the production order with the unique device identification label forming module 222 may form a human readable format using a PDF form '/ACNIP/ZLS_UDI_FORM', which includes creating an interface '/ACNIP/ZLS_UDI_INTF', and the corresponding PDF form '/ACNIP/ZLS_UDI_FORM' to display the UDI label using T code SFP (form builder in SAP®).
Interface Logic:
Interface contains all the logic and form layout may be handled in PDF form.
Read UDI material class maintained in TVARVC table in code initialization part of the interface. For a given material class, read attributes from material classification data such as, implantable (i.e., implantable or not), label use (If single use, then display single use logo in form display), brand name of material, UDI size for material.
Get the plant and ship to party address from T001W & KNA1 table respectively, also add the telephone number from ADRC table in the address,
Form (Human Readable Form) Layout:
Form Layout may be as displayed in which user has selected multiple records with UDI number to display/print UDI label or send it to AL11 for GUDID.
In layout the system 100 may add logos such as company logo (embedded in form), retaion dry logo (embedded in form), do not use if package may be damaged logo (embedded in form), single usage logo (uploaded from SE78, name '/ACNIP/ZLS_SINGLE_USE' as black and white bitmap image), lot number (embedded in form), use by date (embedded in form), and manufacturer image (embedded in form).

Figures 2L, 2M:
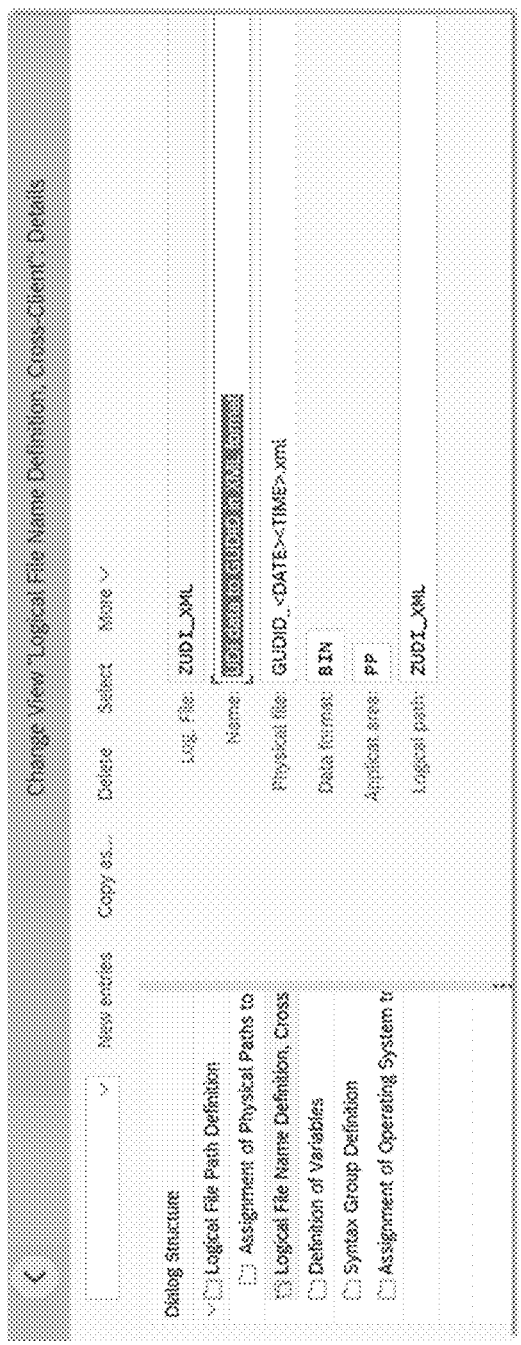

Further in the UDI report the populated field in layout, may include, but are not limited to, lot number, serial number from ATTP module 204, expiry date/use by date, and the like. The aforementioned field values may be populated/passed as form parameters when calling the PDF form from the program logic. Further, in the UDI report the populated field in layout, may include, but are not limited to, implantable characteristic, brand name, UDI material size, ship to party address, manufacturer address, and the like. The aforementioned field values may be populated/passed based on material classification data logic in the system 100.
The Unique Device Identifier (UDI) number display may be passed as human readable form parameter in, but are not limited to, barcode, QR code, braille format, and the like. To display braille font in a print preview of the UDI report, an ADS server may for example, be on version 7.5 SP 19 or higher. To display braille font in Adobe® forms, user may need to install braille font on respective electronic device. Further, sending data to application server for GUDID (third party) is shown in FIG. 2J. Further, creating a logical file name 'ZUDI_XML' using T code file is shown in FIGS. 2K and 2L. Based on file path mentioned in FIGS. 2K and 2L, file may be created on the AL11 server with data. This file path can be changed as per the requirement.

Further, an Extensive Markup Language (XML) transformation to convert internal table data into XML format is shown in FIG. 2M. To transfer data to the XML format, the system 100 may create XML transformation '/ACNIP/ZLS_UDI_XML_TR' with required fields. The XML results from the XML transformation may then be processed by the system 100 to obtain the data in correct structure/format and then transfer to the AL11 file path. The report details may include output type and transaction code as shown in table of FIG. 2N. In an instance, testing requirements with key unit/assembly test conditions is shown in table of FIG. 2O.

Referring back to FIG. 2B, the system 100 may be a standalone SAP® business suite 4 High-Speed Analytical Appliance (S/4 HANA) variant system, i.e., S/4 HAND variant. The S/4 HANA variant system may generate a sequenced serial number. The system 100 of S/4 HANA variant, may include a S/4 HANA module 202. Further, the S/4 HANA module 202 may include sub-modules such as a production order creating module 212, an expiry date identifying module 214, a batch identifying module 216, a finished products identifying module 218, a unique device identification fetching module 220, a production order with unique device identification label forming module 222, a goods receipt and quality inspection module 230, and a serial number generating module 232.

The organization structure may need to be set up in place mirroring the actual structure of the company. The company codes and plants may need to be configured along with the storage locations and warehouses and so on. The customer and material master data must be created. The material master should be extended to the sales views from which the material may be sold/delivered. Furthermore, pricing master data may need to be in place to sell materials. Records may need to be created for automatic determination of batches based on the first-expire first-out strategy condition.

The procedure of standalone S/4 HANA module 202 may be similar to S/4 HANA module 202 in the S/4 Advanced Track & Trace for Pharmaceuticals (S/4-ATTP) variant system. However, the standalone S/4 HANA module 202 may perform all the operations. The standalone S/4 HANA module 202 using the sub-modules may perform operations such as create and release production order, receive goods, check stock and usage decision, create sales order and delivery, post goods issue, create billing, execute UDI report in S/4 display form, create returns sales order (for scrapping), view returns delivery in returns overview, assign serial number and post goods receipt, execute UDI report in S/4 display form, create returns sales order (for receiving into plant), view returns delivery in returns overview, assign serial number and post goods receipt, execute UDI report in S/4 and delivery form, and the like.

Exemplary Scenario

Figure 3A:
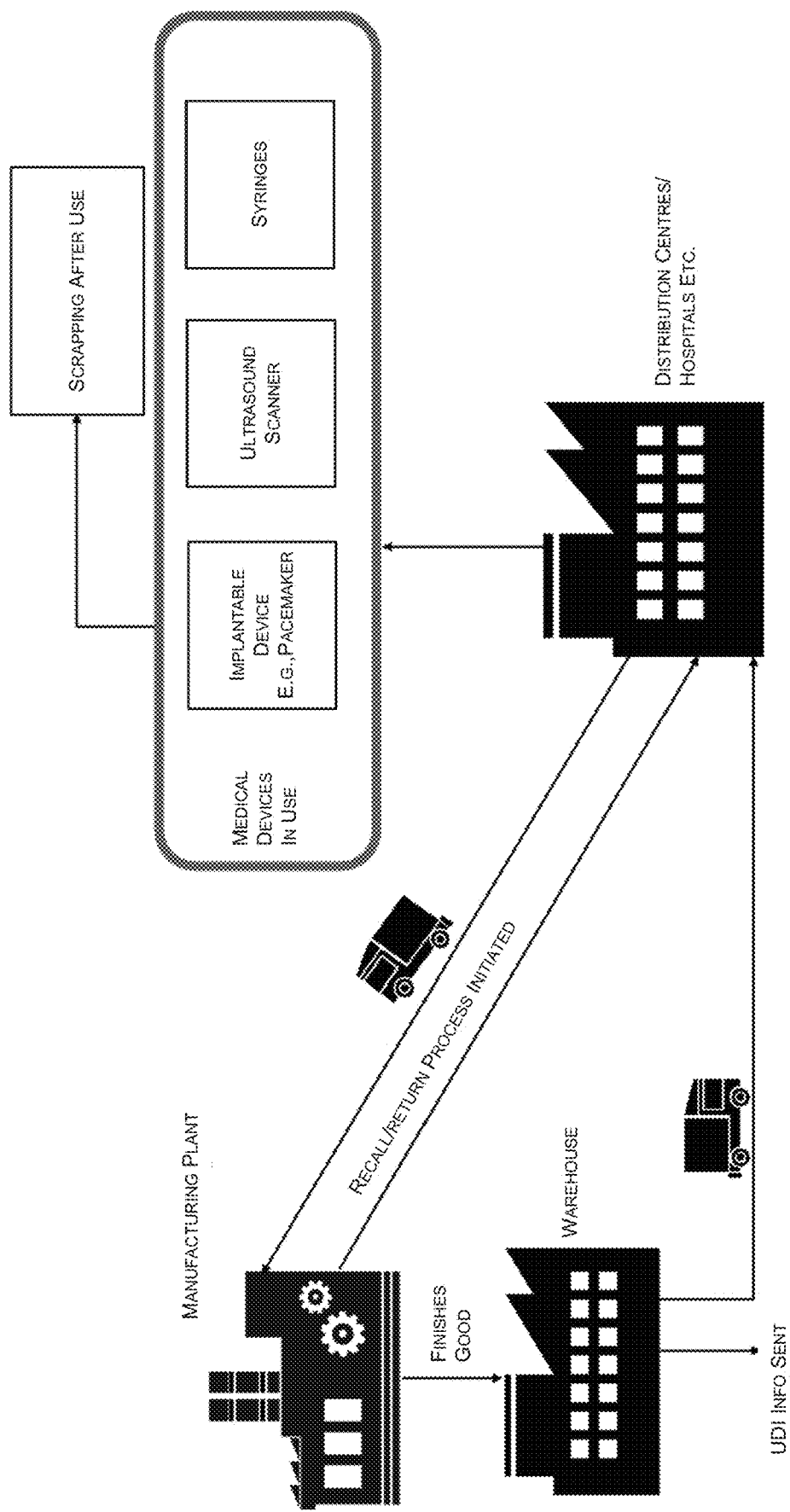
FIG. 3A illustrates a schematic diagram representation of process flow from manufacturing to distribution of devices with unique device identification, according to an example embodiment of the present disclosure.

Consider, a UDI for medical devices scenario as shown in FIG. 3A. The manufacturing plant may manufacture the good and devices. The manufacturing plant may send the finished goods to warehouse. In the warehouse the UDI report may be generated. The finished good with UDI may be sent to the distribution centers, hospitals and the like. The devices in use in hospital may include, implantable device (e.g., pace maker), ultrasound scanner, syringes and the like, which may need to scrapped after use/after prolonged usage.

Figure 3B:
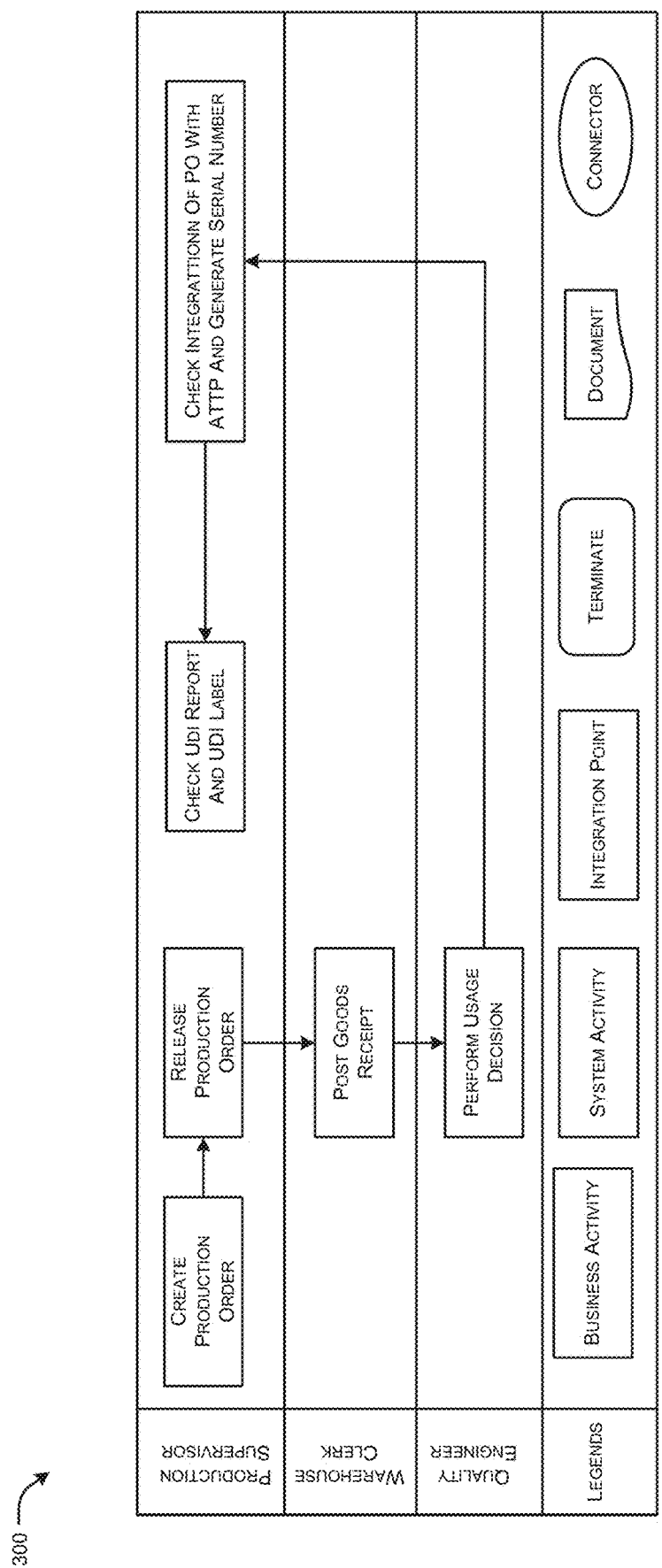
FIG. 3B illustrates an exemplary flow diagram depicting a method for unique device identification for devices using a system of SAP® business suite 4 High-Speed Analytical Appliance (S/4 HANA) and Advanced Track & Trace for Pharmaceuticals (ATTP) variant i.e., S/4-ATTP variant, according to an example embodiment of the present disclosure.
Figure 3C:
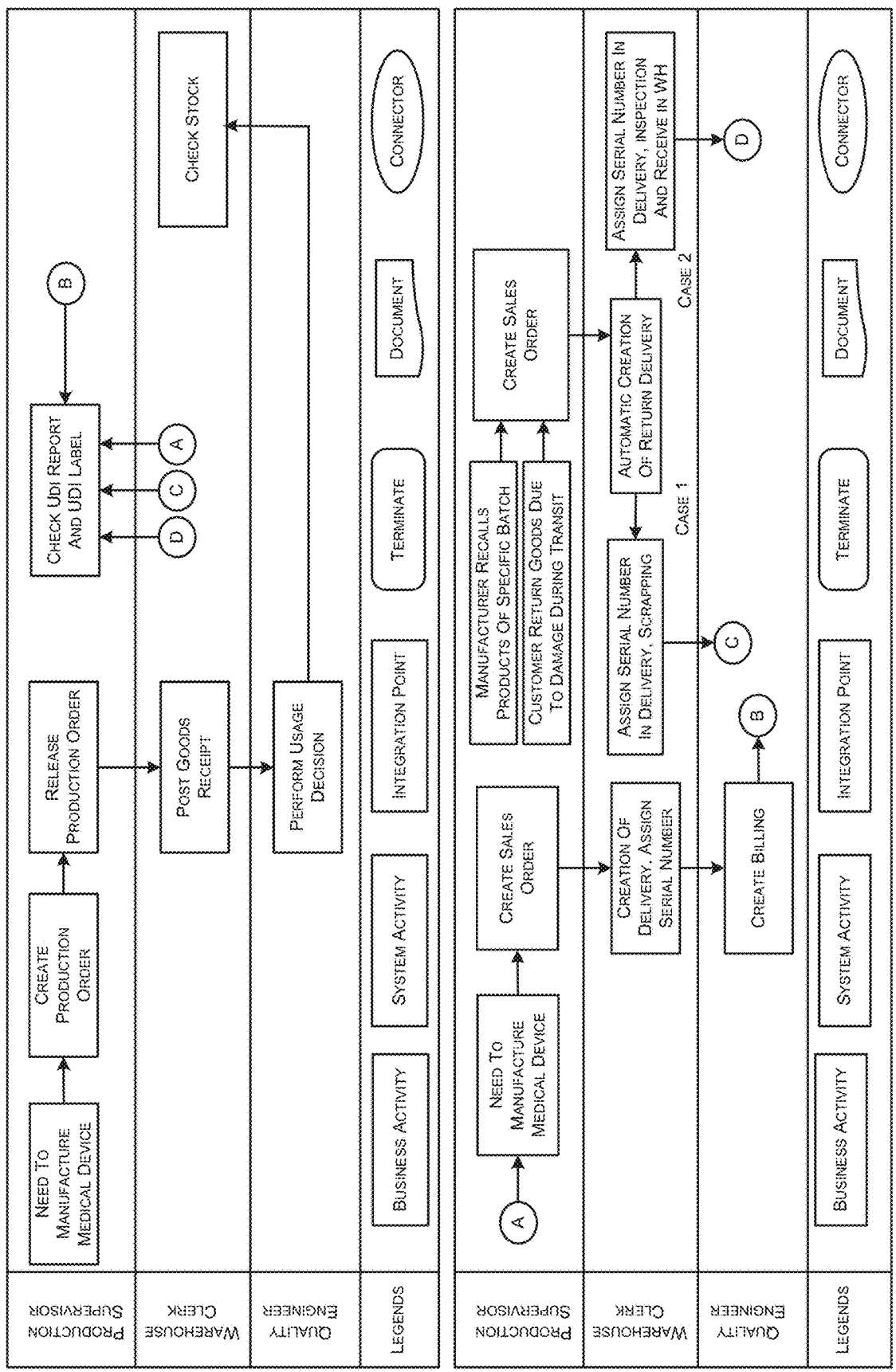
FIG. 3C illustrates an exemplary flow diagram depicting a method for unique device identification for devices using a system of standalone SAP® business suite 4 High-Speed Analytical Appliance (S/4 HANA) variant i.e., standalone S/4 variant, according to an example embodiment of the present disclosure.

FIG. 3B illustrates an exemplary flow diagram depicting a method for unique device identification for devices using a system of SAP® business suite 4 High-Speed Analytical Appliance (S/4 HANA) and Advanced Track & Trace for Pharmaceuticals (ATTP) variant i.e., S/4-ATTP variant. The method includes creating production order, releasing production order, receiving goods, perform usage decision, checking integration of PO with ATTP and generating serial number, and checking UDI report and label. Similarly, FIG. 3C illustrates exemplary flow diagrams depicting a method for unique device identification for devices using a system of standalone SAP® business suite 4 High-Speed Analytical Appliance (S/4 HANA) variant i.e., standalone S/4 variant, according to an example embodiment of the present disclosure. The method includes, determining a need to manufacture device, creating production order, releasing production order, receiving goods, perform usage decision, checking stock, and checking UDI report and label. For checking UDI report, the creating sales order, creating delivery, assign serial number, creating billing, and proving to create UDI report and UDI label. Further, if, for example, the manufacturer/vendor recalls products of specific batch and the customer returns goods due to damage during transit, creating return sales order, automatic creation of return delivery and assign serial number in delivery, scrapping (case 1) and assign serial number in delivery, inspection and receive WH (case 2) as shown in FIG. 3C. In both cases a production supervisor may provide the information to create the UDI report and UDI label.

In an instance, the UDI number may be unique for each device based on a combination of well-defined criteria. For example, the Unique Device Identification for standards product identification (GS1), Device Identifier (DI) for Global Trade Item Number (GTIN), Production Identifier (PI) for Application Identifier (AI), DI+PI=UDI for GTIN or GTIN+AI(s)=UDI. The UDI may need to be generated for each device. For example, for class III devices where one device may be packed in each package (there may not be multiple devices packed in one package) may be shown in the exemplary embodiments herein. The UDI number may be achieved by concatenation of the Device Identifier (DI) and the Production Identifier (PI). The UDI may be utilized in device traceability and as a regulatory requirement.

Figure 3D:
FIG. 3D illustrates an exemplary schematic diagram representation of UDI form of logos, respectively according to an example embodiment of the present disclosure.
Figure 3D:
Figure 3D:
Figure 3D:
Figure 3D:
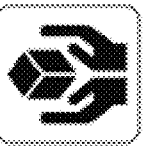
Figure 3D:
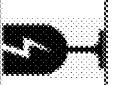
Figure 3D:
Figure 3D:
Figure 3D:
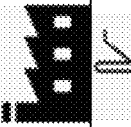
Figure 3D:

The inputs required to be entered in SAP S/4 HANA module 202 to generate UDI Report may include, but are not limited to, a material (range to be given), plan (range to be given), a production order (range to be given), a shelf-life expiry date (range to be given), a GTIN number (range to be given), a serial number (range to be given), a batch number (range to be given), a sales order (range to be given), a production order date (range to be given), a serial number (range to be given), a customer (range to be given), a delivery (range to be given), an invoice document (range to be given), and the like. Further, the list of outputs, part of the generated UDI report, may include, but are not limited to, a material number, a material description, a production order, a batch shelf-life expiry date, a GTIN, a serial number, a sales order, an invoice number, a customer, a UDI number. The UDI number=(01) GTIN number+(21) serial number+(10) batch+(17) expiry date. Further, option to print the UDI number may be provided using 'Print UDI' button on the display. User may be able to select single/multiple rows to display/print UDI labels. Print preview of the UDI label may also be available to view. The UDI label generated has braille interpretation included to make it more inclusive. An exemplary UDI report may be shown in FIG. 2F. Further, the overview of UDI form print-preview of braille enabled label is shown in FIG. 2G. The UDI form logos used may be shown in FIG. 3D.

For example, the UDI report may be been generated assuming that the devices are large in size and one device may be packed in one packaging. There may not be any such packaging where multiple devices are packed. Further, destination country may be same for a batch. There may be no Manufacturing Execution Systems (MES) or trace link line available. The above example of the UDI report in FIG. 2F may be for class III devices, considering packaging needs, however, the UDI report may be generated for any class devices.

Figure 4A:
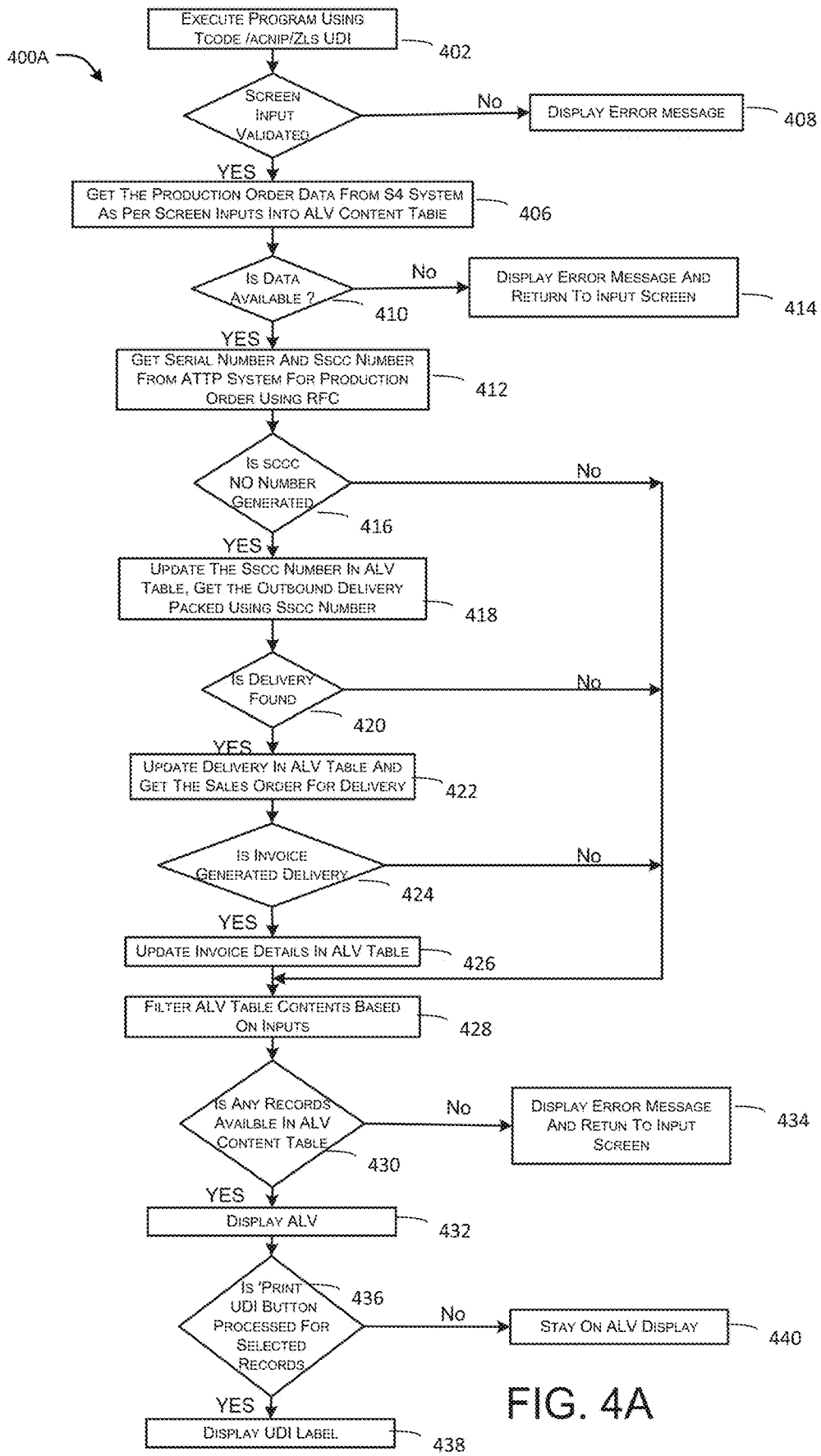
FIGS. 4A and 4B illustrate flow diagram representations of method for S/4-ATTP based and standalone S/4 based UDI label creation, respectively, according to an example embodiment of the present disclosure.

FIG. 4A illustrates flow diagram representations of method 400A for S/4-ATTP based UDI label creation, respectively, according to an example embodiment of the present disclosure. At step 402, the method 400A includes, executing program using Transaction (T) code. At step 404, the method 400A includes validating screen inputs. At step 406, the method 400A includes, obtaining production order data from S/4 HANA module 202, based on screen inputs into ALV content table. At step 408, the method 400A includes displaying error message, if the screen inputs may not be valid. At step 410, the method 400A includes, determining if the data may be available. If the data may be available, at step 412, the method 400A includes obtaining serial number and SSCC number from ATTP module 204 using RFC module, for production order. If the data may not be available, at step 414, the method 400A includes displaying error message and return to input screen. At step 416, the method 400A includes determining if the SSCC number may be generated. If the SSCC number may be generated, at step 418, the method 400A includes updating the SSCC number in ALV table, obtaining the outbound delivery, and packing using SSCC number. At step 420, the method 400A includes, determining of the delivery os found. If the delivery may be found, at step 422, the method 400A includes updating delivery in ALV table and obtaining sales order for delivery. At step 424, the method 400A includes, determining if the invoice may be generated for delivery. If the invoice may be generated for delivery, at step 426, the method 400A includes updating invoice details in the ALV table. Based on updating invoice details in the ALV table, and if no SSCC number may be generated, no delivery may be found, no invoice may be generated for delivery, at step 428, the method 400A includes filtering ALV table based on the inputs. At step 430, the method 400A includes determining any record available in ALV content table. If yes, at step 432, the method 400A includes displaying ALV table, if no at step 434, the method 400A includes displaying error message and return to input screen. At step 436, the method 400A includes determining print UDI button processed for selected records. If yes, at step 438, the method 400A includes displaying UDI label, if no, at step 440, the method 400A includes staying on ALV display.

Figure 4B:
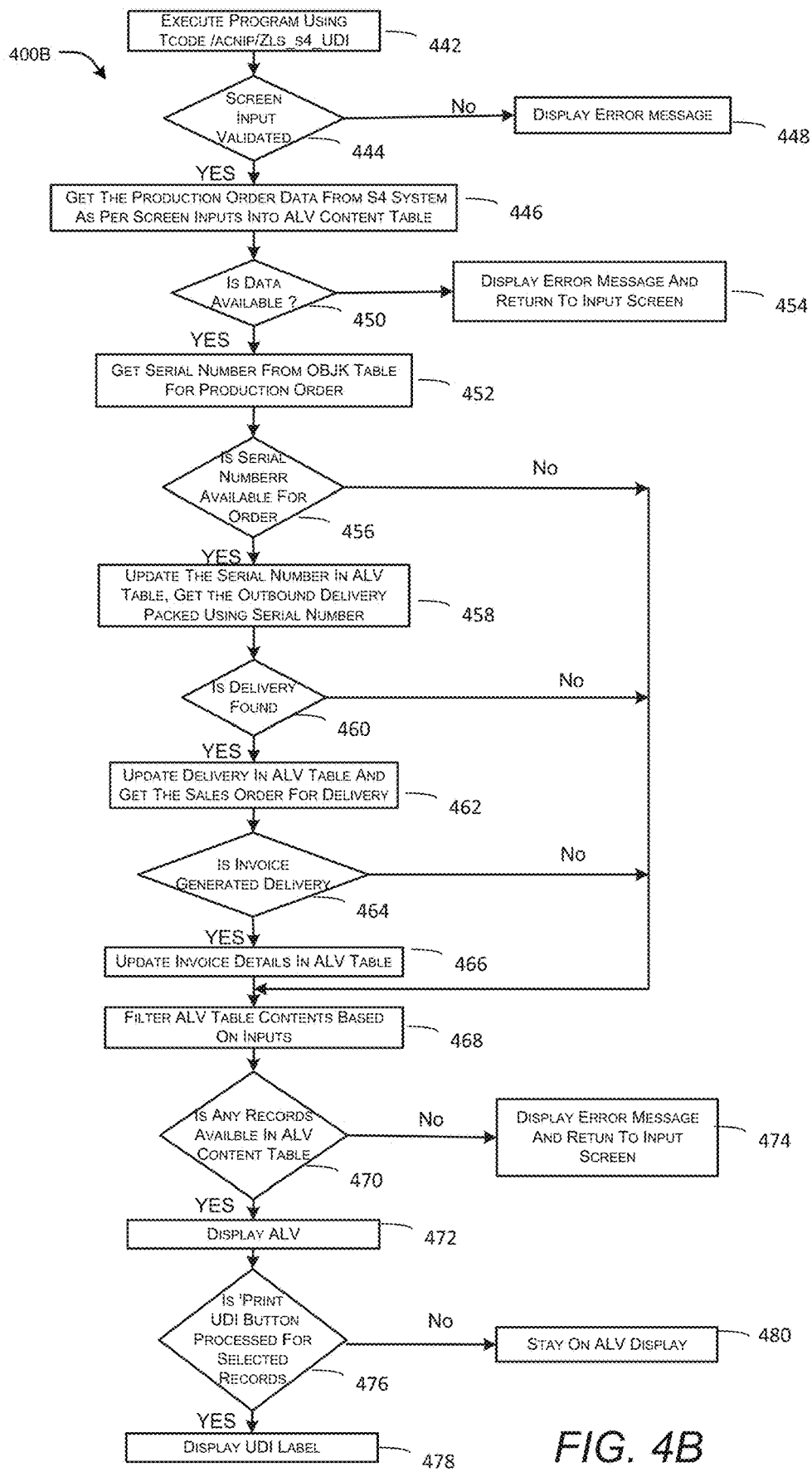

FIG. 4B illustrates a flow diagram representation of method 400B for standalone S/4 based UDI label creation, respectively, according to an example embodiment of the present disclosure. At step 442, the method 400B includes, executing program using Transaction (T) code. At step 444, the method 400B includes validating screen inputs. At step 446, the method 400B includes, obtaining production order data from S/4 HANA module 202, based on screen inputs into ALV content table. At step 448, the method 400B includes displaying error message, if the screen inputs are not valid. At step 450, the method 400B includes, determining if the data may be available. If the data may be available, at step 452, the method 400B includes obtaining serial number from OBJK table for production order. If the data may not be available, at step 454, the method 400B includes displaying error message and return to input screen. At step 456, the method 400B includes determining if the serial number may be available for production order. If the serial number may be available, at step 458, the method 400B includes updating the serial number in ALV table, obtaining the outbound delivery, packing using serial number. At step 460, the method 400B includes, determining of the delivery may be found. If the delivery may be found, at step 462, the method 400B includes updating delivery in ALV table and obtaining sales order for delivery. At step 464, the method 400B includes, determining if the invoice may be generated for delivery. If the invoice may be generated for delivery, at step 466, the method 400B includes updating invoice details in the ALV table. Based on updating invoice details in the ALV table, and if no serial number may be generated, no delivery may be found, no invoice may be generated for delivery, at step 468, the method 400B includes filtering ALV table based on the inputs. At step 470, the method 400B includes determining any record available in ALV content table. If yes, at step 472, the method 400B includes displaying ALV table, if no at step 474, the method 400B includes displaying error message and return to input screen. At step 476, the method 400B includes determining print UDI button processed for selected records. If yes, at step 478, the method 400B includes displaying UDI label, if no, at step 480, the method 400B includes staying on ALV display.

Figure 5:
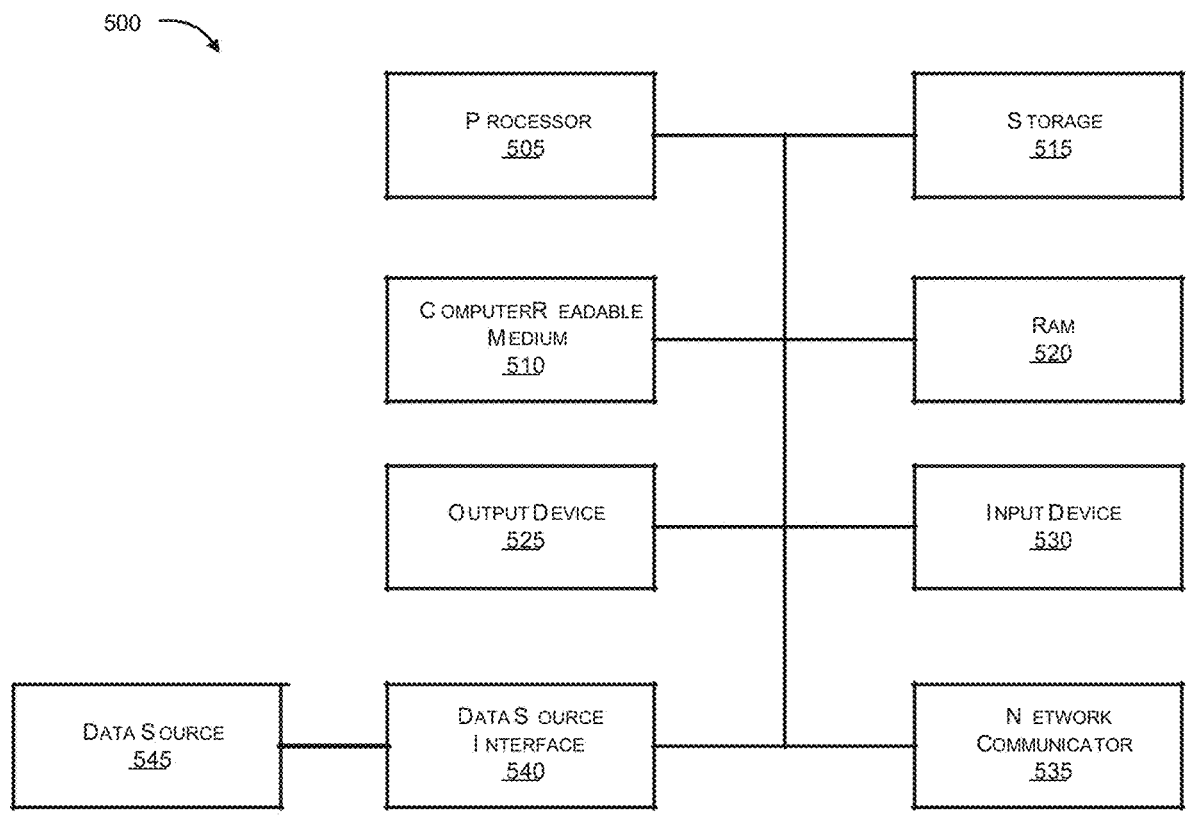
FIG. 5 illustrates a hardware platform for implementation of the disclosed system, according to an example embodiment of the present disclosure.

FIG. 5 illustrates a hardware platform 500 for implementation of the disclosed system, according to an example embodiment of the present disclosure. For the sake of brevity, construction and operational features of the system 500 which are explained in detail above are not explained in detail herein. Particularly, computing machines such as but not limited to internal/external server clusters, quantum computers, desktops, laptops, smartphones, tablets, and wearables which may be used to execute the system 100 or may include the structure of the hardware platform 500. As illustrated, the hardware platform 500 may include additional components not shown, and that some of the components described may be removed and/or modified. For example, a computer system with multiple GPUs may be located on external-cloud platforms including Amazon Web Services, or internal corporate cloud computing dusters, or organizational computing resources, etc.

The hardware platform 500 may be a computer system such as the system 100 that may be used with the embodiments described herein. The computer system may represent a computational platform that includes components that may be in a server or another computer system. The computer system may execute, by the processor 505 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 505 that executes software instructions or code stored on a non-transitory computer-readable storage medium 510 to perform methods of the present disclosure. The software code includes, for example, instructions to gather data and documents and analyze documents. In an example, the UDIP 104 may be software codes or components performing these steps.

The instructions on the computer-readable storage medium 510 are read and stored the instructions in storage 515 or in random access memory (RAM). The storage 515 may provide a space for keeping static data where at least some instructions could be stored for later execution. The stored instructions may be further compiled to generate other representations of the instructions and dynamically stored in the RAM such as RAM 520. The processor 505 may read instructions from the RAM 520 and perform actions as instructed.

The computer system may further include the output device 525 to provide at least some of the results of the execution as output including, but not limited to, visual information to users, such as external agents. The output device 525 may include a display on computing devices and virtual reality glasses. For example, the display may be a mobile phone screen or a laptop screen. GUIs and/or text may be presented as an output on the display screen. The computer system may further include an input device 530 to provide a user or another device with mechanisms for entering data and/or otherwise interact with the computer system. The input device 530 may include, for example, a keyboard, a keypad, a mouse, or a touchscreen. Each of these output devices 525 and input device 530 may be joined by one or more additional peripherals. For example, the output device 525 may be used to display the results such as bot responses by the executable chatbot.

A network communicator 535 may be provided to connect the computer system to a network and in turn to other devices connected to the network including other clients, servers, data stores, and interfaces, for instance. A network communicator 535 may include, for example, a network adapter such as a LAN adapter or a wireless adapter. The computer system may include a data sources interface 540 to access the data source 545. The data source 545 may be an information resource. As an example, a database of exceptions and rules may be provided as the data source 545. Moreover, knowledge repositories and curated data may be other examples of the data source 545.

Figure 6:
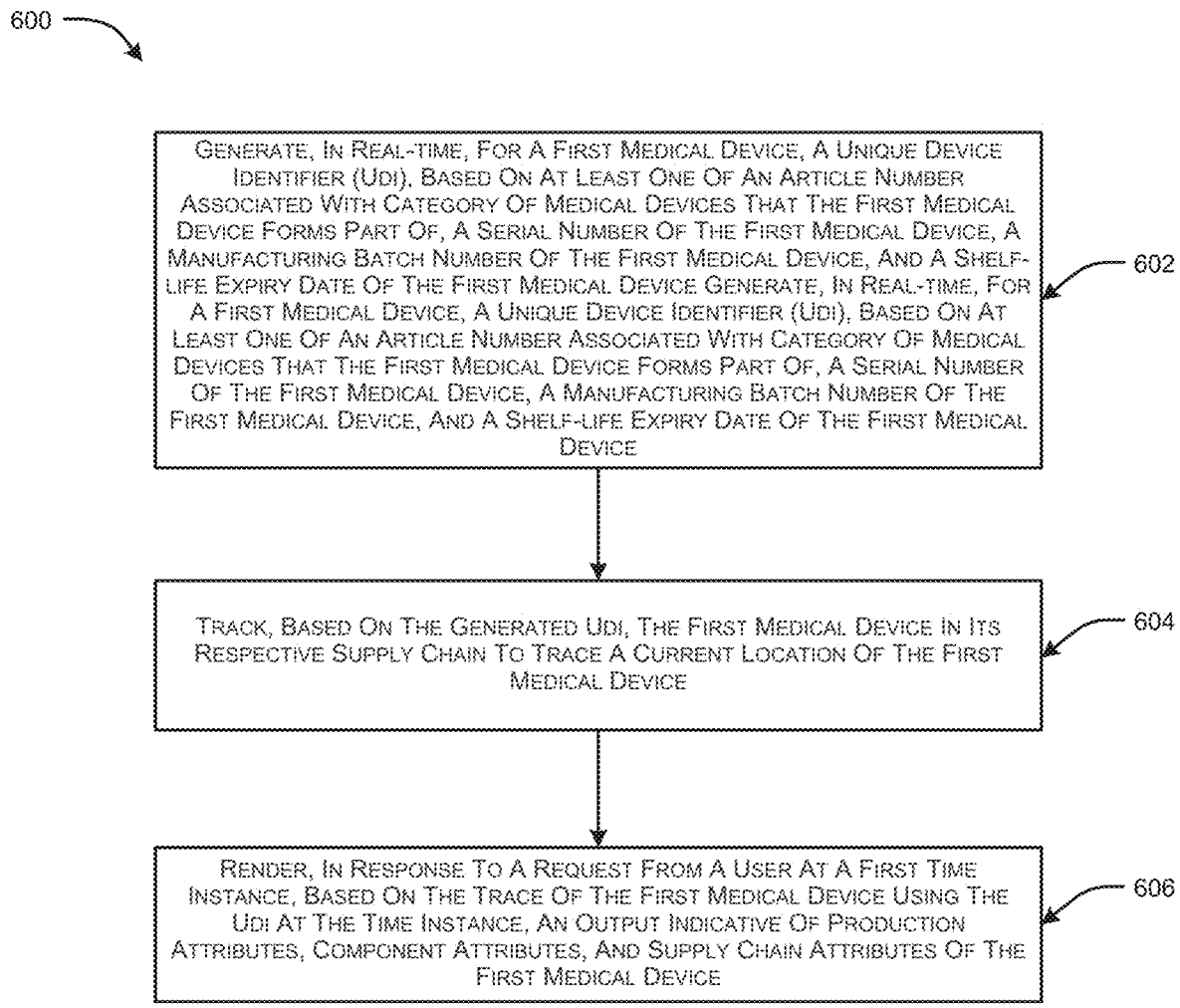
FIG. 6 illustrates a flow chart depicting a method for unique device identification of devices, according to an example embodiment of the present disclosure.

FIG. 6 illustrates a flow diagram depicting method 600 of unique device identification for devices, according to an example embodiment of the present disclosure.

At block 602, the method 600 may include generating, by the UDIP 104 via the processor 102, in real-time, for a first device, a unique device identifier (UDI), based on at least one of an article number associated with category of devices that the first device forms part of, a serial number of the first device, a manufacturing batch number of the first device, and a shelf-life expiry date of the first device;

At block 604, the method 600 may include tracking, by the UDIP 104 via the processor 102, based on the generated UDI, the first device in its respective supply chain to trace a current location of the first device.

At block 606, the method 600 may include rendering, by the UDIP 104 via the processor 102, in response to a request message from a user at a first-time instance, based on the trace of the first device using the UDI at the time instance, an output indicative of production attributes, component attributes, and supply chain attributes of the first device.

The order in which the method 600 are described may not be intended to be construed as a limitation, and any number of the described method blocks may be combined or otherwise performed in any order to implement the method 600 or an alternate method. Additionally, individual blocks may be deleted from the method 600 without departing from the spirit and scope of the present disclosure described herein. Furthermore, the method 600 may be implemented in any suitable hardware, software, firmware, or a combination thereof, that exists in the related art or that is later developed. The method 600 describes, without limitation, the implementation of the system 100. A person of skill in the art will understand that method 600 may be modified appropriately for implementation in various manners without departing from the scope and spirit of the disclosure.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which ail terms are meant in their broadest reasonable sense unless otherwise indicated.

We claim:

1. A system comprising:
a processor; and
a memory coupled to the processor, wherein the memory comprises processor-executable instructions, which on execution, cause the processor to:
generate a selection screen with screen elements for obtaining inputs for each of the screen elements from a user;
validate the screen elements based on corresponding screen elements pre-stored in a data table and information from a plurality of databases, wherein the screen elements comprise at least one of an article number of a first device, a serial number of the first device, a manufacturing batch number of the first device, and a shelf-life expiry date of the first device;
remotely transfer, via a remote function call module communicatively coupled to the processor, a production order data corresponding to the first device from a High-Speed Analytical Appliance (HANA) system to an Advanced Track and Trace for Pharmaceuticals (ATTP) system by passing a temporary table of production orders, a date, the serial number and a serial number container (SSCC) number as document list to the ATTP system, and wherein the production order data comprises the manufacturing batch number;
obtain, in response to the remotely transferred production order data, an updated serial number and a container (SSCC) number, from the ATTP system by remotely accessing the ATTP system at real-time, wherein the SSCC number is updated by:
determining a transaction identifier corresponding to at least one of a document type and a document year of each of the document list;
determining an object identifier corresponding to the determined transaction identifier;
obtaining the updated serial number and the updated SSCC number corresponding to the production order data based on the determined object identifier; and
updating the temporary table with the updated serial number and the updated SSCC number;
generate, in real-time, for the first device, a unique device identifier (UDI), based on at least one of the article number of the first device, the serial number of the first device, the manufacturing batch number of the first device, and the shelf-life expiry date of the first device upon successful validation of the screen elements;
track, based on the generated UDI, the first device in its respective supply chain to trace a current location of the first device;
render, in response to a request message from the user at a first-time instance, based on the trace of the first device using the UDI at the first time instance, an output indicative of production attributes, component attributes, and supply chain attributes of the first device; and
generate a UDI report based on at least one of a material, a plan, the production order data, the shelf-life expiry date, a Global Trade Item Number (GTIN) number, the serial number, the manufacturing batch number, a sales order, a production order date, a customer, delivery data, an invoice document, and information in case a manufacturer recalls the first device of a specific batch, wherein the information is generated based on at least one of a return sales order created, a return delivery order created and an assigned serial number of the first device.

2. The system as claimed in claim 1, wherein the production attributes of the first device comprise at least one of parameters associated with material used in manufacturing of the first device, a plant where the first device were manufactured, a lot number, a production order, the global trade item number (GTIN), the serial number of the first device, the manufacturing batch number of the first device, the shelf-life expiry date of the first device, the production order date, a customer name, a price, a tax, a discount, a warranty, a bank account, and an address.

3. The system as claimed in claim 1, wherein the component attributes of the first device are selected from at least one of attributes, identifiers, and parameters of one or more components or sub-components that form part of the first device.

4. The system as claimed in claim 1, wherein the supply chain attributes comprise information associated with transfer/flow of the first device and respective components thereof across the supply chain from sourcing to production to delivery and distribution of the first device to flow of the first device during recall/return of the first device or any component thereof.

5. The system as claimed in claim 1, wherein the UDI is either generated in real-time or is serially generated.

6. The system as claimed in claim 1, wherein the UDI is printed on a label and affixed to the first device post production.

7. The system as claimed in claim 1, wherein the UDI is configured in the form of at least one of a barcode, a QR code, and in Braille format.

8. A method of unique device identification for devices, the method comprising:
   generating, by a processor, a selection screen with screen elements for obtaining inputs for each of the screen elements from a user;
   validating, by the processor, the screen elements based on corresponding screen elements pre-stored in a data table and information from a plurality of databases, wherein the screen elements comprise at least one of an article number of a first device, a serial number of the first device, a manufacturing batch number of the first device, and a shelf-life expiry date of the first device;
   remotely transferring, by a remote function call module communicatively coupled to the processor, a production order data corresponding to the first device from a High-Speed Analytical Appliance (HANA) system to an Advanced Track and Trace for Pharmaceuticals (ATTP) system by passing a temporary table of production orders, a date, the serial number and a serial number container (SSCC) number as document list to the ATTP system, and wherein the production order data comprises the manufacturing batch number;
   obtaining, by the processor, in response to the remotely transferred production order data, an updated serial number and a container (SSCC) number, from the ATTP system by remotely accessing the ATTP system at real-time, wherein the SSCC number is updated by:
      determining, by the processor, a transaction identifier corresponding to at least one of a document type and a document year of each of the document list;
      determining, by the processor, an object identifier corresponding to the determined transaction identifier;
      obtaining, by the processor, the updated serial number and the updated SSCC number corresponding to the production order data based on the determined object identifier; and
      updating, by the processor, the temporary table with the updated serial number and the updated SSCC number;
   generating, by the processor, in real-time, for the first device, a unique device identifier (UDI), based on at least one of the article number of the first device, the serial number of the first device, the manufacturing batch number of the first device, and the shelf-life expiry date of the first device upon successful validation of the screen elements;
   tracking, by the processor, based on the generated UDI, the first device in its respective supply chain to trace a current location of the first device;
   rendering, by the processor, in response to a request message from the user at a first-time instance, based on the trace of the first device using the UDI at the first time instance, an output indicative of production attributes, component attributes, and supply chain attributes of the first device; and
   generating, by the processor, a UDI report based on at least one of a material, a plan, the production order data, the shelf-life expiry date, a Global Trade Item Number (GTIN) number, the serial number, the manufacturing batch number, a sales order, a production order date, a customer, delivery data, an invoice document, and information in case a manufacturer recalls the first device of a specific batch, wherein the information is generated based on at least one of a return sales order created, a return delivery order created and an assigned serial number of the first device.

9. The method as claimed in claim 8, wherein the production attributes of the first device comprise at least one of parameters associated with material used in manufacturing of the first device, a plant where the first device or parts thereof were manufactured, a lot number, a production order, the global trade item number (GTIN), the serial number of the first device, the manufacturing batch number of the first device, the shelf-life expiry date of the first device, the production order date, a customer name a price, a tax, a discount, a warranty, a bank account, and an address.

10. The method as claimed in claim 8, wherein the component attributes of the first device are selected from at least one of attributes, identifiers, and parameters of one or more components or sub-components that form part of the first device.

11. The system as claimed in claim 1, wherein the supply chain attributes comprise information associated with transfer/flow of the first device and respective components thereof across the supply chain from sourcing to production to delivery and distribution of the first device to flow of the first device during recall/return of the first device or any component thereof.

12. The method as claimed in claim 8, wherein the UDI is either generated in real-time or is serially generated.

13. The method as claimed in claim 8, wherein the UDI is printed on a label and affixed to the first device post production.

14. The method as claimed in claim 8, wherein the UDI is configured in the form of at least one of a barcode, a QR code, and in Braille format.

15. A non-transitory computer readable medium, wherein the readable medium comprises machine executable instructions that are executable by a processor to:
   generate a selection screen with screen elements for obtaining inputs for each of the screen elements from a user;
   validate the screen elements based on corresponding screen elements pre-stored in a data table and information from a plurality of databases, wherein the screen elements comprise at least one of an article number of a first device, a serial number of the first device, a manufacturing batch number of the first device, and a shelf-life expiry date of the first device;
   remotely transfer, a production order data corresponding to the first device from a High-Speed Analytical Appliance (HANA) system to an Advanced Track and Trace for Pharmaceuticals (ATTP) system by passing a temporary table of production orders, a date, the serial number and a serial number container (SSCC) number as document list to the ATTP system, and wherein the production order data comprises the manufacturing batch number;
   obtain, in response to the remotely transferred production order data, an updated serial number and a container (SSCC) number, from the ATTP system by remotely accessing the ATTP system at real-time, wherein the SSCC number is updated by:
      determining a transaction identifier corresponding to at least one of a document type and a document year of each of the document list;

determining an object identifier corresponding to the determined transaction identifier;

obtaining the updated serial number and the updated SSCC number corresponding to the production order data based on the determined object identifier; and updating the temporary table with the updated serial number and the updated SSCC number;

generate, in real-time, for the first device, a unique device identifier (UDI), based on at least one of the article number of the first device, the serial number of the first device, the manufacturing batch number of the first device, and the shelf-life expiry date of the first device upon successful validation of the screen elements;

track, based on the generated UDI, the first device in its respective supply chain to trace a current location of the first device;

render, in response to a request message from the user at a first-time instance, based on the trace of the first device using the UDI at the first time instance, an output indicative of production attributes, component attributes, and supply chain attributes of the first device; and generate a UDI report based on at least one of a material, a plan, the production order data, the shelf-life expiry date, a Global Trade Item Number (GTIN) number, the serial number, the manufacturing batch number, a sales order, a production order date, a customer, delivery data, an invoice document, and information in case a manufacturer recalls the first device of a specific batch, wherein the information is generated based on at least one of a return sales order created, a return delivery order created and an assigned serial number of the first device.

16. The non-transitory computer readable medium as claimed in claim 15, wherein the production attributes of the first device comprise at least one of parameters associated with material used in manufacturing of the first device, a plant where the first device were manufactured, a lot number, a production order, the global trade item number (GTIN), the serial number of the first device, the manufacturing batch number of the first device, the shelf-life expiry date of the first device, the production order date, a customer name a price, a tax, a discount, a warranty, a bank account, and an address.

17. The non-transitory computer readable medium as claimed in claim 15, wherein the component attributes of the first device are selected from at least one of attributes, identifiers, and parameters of one or more components or sub-components that form part of the first device.

18. The non-transitory computer readable medium as claimed in claim 15, wherein the supply chain attributes comprise information associated with transfer/flow of the first device and respective components thereof across the supply chain from sourcing to production to delivery and distribution of the first device to flow of the first device during recall/return of the first device or any component thereof.

19. The non-transitory computer readable medium as claimed in claim 15, wherein the UDI is either generated in real-time or is serially generated, wherein the UDI is printed on a label and affixed to the first device post production.

20. The non-transitory computer readable medium as claimed in claim 15, wherein the UDI is configured in the form of at least one of a barcode, a QR code, and in Braille format.

* * * * *